(12) United States Patent
Barak (10) Patent No.: US 10,771,821 B2
(45) Date of Patent: Sep. 8, 2020

(54) OVERCOMING LOST IP PACKETS IN STREAMING VIDEO IN IP NETWORKS

(71) Applicant: Gamefly Israel Ltd., Caesarea (IL)

(72) Inventor: Asaf Barak, Yokneam (IL)

(73) Assignee: Electronic Arts Inc., Redwood City, CA (US)

( * ) Notice: Subject to any disclaimer, the term of this patent is extended or adjusted under 35 U.S.C. 154(b) by 0 days.

(21) Appl. No.: 15/214,298

(22) Filed: Jul. 19, 2016

(65) Prior Publication Data

US 2016/0330487 A1 Nov. 10, 2016

Related U.S. Application Data

(63) Continuation of application No. 13/898,150, filed on May 20, 2013, now Pat. No. 9,407,923.

(51) Int. Cl.
*H04N 19/176* (2014.01)
*H04N 19/107* (2014.01)
*H04N 19/166* (2014.01)
*H04N 19/895* (2014.01)

(52) U.S. Cl.
CPC ......... *H04N 19/895* (2014.11); *H04N 19/107* (2014.11); *H04N 19/166* (2014.11); *H04N 19/176* (2014.11)

(58) Field of Classification Search
CPC .. H04N 19/166; H04N 19/895; H04N 19/107; H04N 19/176
USPC ...................................................... 375/240.27
See application file for complete search history.

(56) References Cited

U.S. PATENT DOCUMENTS

| | | | |
|---|---|---|---|
| 5,659,539 A | 8/1997 | Porter et al. | |
| 5,825,425 A | 10/1998 | Kazui et al. | |
| 6,081,296 A | 6/2000 | Fukunaga et al. | |
| 6,104,757 A | 8/2000 | Rhee | |
| 6,611,561 B1 | 8/2003 | Hannuksela et al. | |
| 6,683,988 B1 * | 1/2004 | Fukunaga | G06T 9/004 348/E5.003 |
| 6,732,313 B2 * | 5/2004 | Fukushima | H04L 1/1642 375/240.27 |

(Continued)

OTHER PUBLICATIONS

Final Office Action dated Nov. 30, 2105, for U.S. Appl. No. 13/898,150, filed May 20, 2013, twelve pages.

(Continued)

*Primary Examiner* — Christopher S Kelley
*Assistant Examiner* — Kathleen M Walsh
(74) *Attorney, Agent, or Firm* — McDermott Will & Emery LLP (57) ABSTRACT

A computer-implemented method, apparatus and computer program product for recovering from lost packets in video transmissions, the method performed by a computerized device, comprising: receiving by a computing device associated with a subscriber a frame constituting a part of video transmission, from an encoder; decoding the frame; determining that a packet within the frame is missing or corrupted; notifying an encoder about a missing packet; receiving from the encoder a first frame in which a first part is encoded independently of a preceding frame; decoding the first frame; receiving from the encoder a second frame in which a second part different from the first part is encoded independently of a preceding frame; and decoding the second frame.

14 Claims, 3 Drawing Sheets

(56) References Cited

U.S. PATENT DOCUMENTS

| | | |
|---|---|---|
| 7,120,308 B2 | 10/2006 | Guleryuz |
| 7,146,053 B1 | 12/2006 | Rijavec et al. |
| 7,209,520 B2 | 4/2007 | Kadono et al. |
| 7,526,026 B2 | 4/2009 | Kadono et al. |
| 7,742,529 B1 | 6/2010 | Ghanbari |
| 7,764,737 B2 | 7/2010 | Setton et al. |
| 7,802,168 B1 | 9/2010 | Apostolopoulos et al. |
| 8,238,427 B2 | 8/2012 | Nagori |
| 8,335,388 B2 | 12/2012 | Satou et al. |
| 8,355,437 B2 | 1/2013 | Hannuksela |
| 8,379,734 B2 | 2/2013 | Teng et al. |
| 8,503,444 B2 | 8/2013 | Suneya |
| 8,503,528 B2 | 8/2013 | Grange et al. |
| 8,605,785 B2 | 12/2013 | Henocq et al. |
| 8,630,346 B2 | 1/2014 | Chappalli et al. |
| 8,634,413 B2 | 1/2014 | Lin et al. |
| 8,654,863 B2 | 2/2014 | Hannuksela |
| 8,693,540 B2 | 4/2014 | Shi et al. |
| 8,780,986 B2 * | 7/2014 | Wu .................... H04N 7/26031 375/240.13 |
| 8,804,821 B2 | 8/2014 | Ali |
| 8,929,443 B2 | 1/2015 | Crinon et al. |
| 8,958,486 B2 | 2/2015 | Rodriguez et al. |
| 9,479,800 B2 * | 10/2016 | NepomucenoLeung .................... H04N 19/107 |
| 2004/0218673 A1 * | 11/2004 | Wang ............... H04N 21/23424 375/240.12 |
| 2005/0123045 A1 | 6/2005 | Hannuksela |
| 2006/0104366 A1 * | 5/2006 | Huang ................. H04N 19/147 375/240.27 |
| 2006/0133514 A1 * | 6/2006 | Walker ............... H04N 21/6377 375/240.27 |
| 2007/0086527 A1 * | 4/2007 | Yan ........................ H04N 19/61 375/240.24 |
| 2007/0147517 A1 | 6/2007 | Hu |
| 2008/0049845 A1 | 2/2008 | Liu |
| 2008/0198929 A1 | 8/2008 | Fujihara |
| 2008/0232478 A1 * | 9/2008 | Teng ................ H04N 19/00939 375/240.27 |
| 2009/0052531 A1 | 2/2009 | Mulroy et al. |
| 2009/0103617 A1 * | 4/2009 | Au ...................... H04N 19/176 375/240.13 |
| 2009/0213940 A1 * | 8/2009 | Steinbach ............ H04N 19/176 375/240.27 |
| 2009/0252227 A1 * | 10/2009 | NepomucenoLeung .................... H04N 19/89 375/240.13 |
| 2010/0050225 A1 | 2/2010 | Bennett |
| 2010/0067578 A1 | 3/2010 | Nakagawa |
| 2010/0177776 A1 | 7/2010 | Crinon et al. |
| 2012/0079329 A1 | 3/2012 | Steinbach et al. |
| 2012/0219073 A1 * | 8/2012 | NepomucenoLeung .................... H04N 19/107 375/240.27 |
| 2013/0058394 A1 * | 3/2013 | Nilsson .................. H04N 19/89 375/240.02 |
| 2013/0298178 A1 * | 11/2013 | Perlman ............. H04N 21/2381 725/116 |
| 2014/0269917 A1 * | 9/2014 | Van der Laan ...... H04N 19/105 375/240.16 |

OTHER PUBLICATIONS

Non-Final Office Action dated May 29, 2105, for U.S. Appl. No. 13/898,150, filed May 20, 2013, nine pages.

Notice of Allowance dated Apr. 5, 2016, for U.S. Appl. No. 13/898,150, filed May 20, 2013, eight pages.

* cited by examiner

OVERCOMING LOST IP PACKETS IN STREAMING VIDEO IN IP NETWORKS

CROSS-REFERENCE TO RELATED APPLICATION

This application is a continuation of U.S. patent application Ser. No. 13/898,150, filed on May 20, 2013, now published as U.S. Publication No. 2014-0341307, the entire disclosure of which is incorporated herein by reference.

TECHNICAL FIELD

The present disclosure relates media streaming in general, and to a method and apparatus for overcoming lost IP frames in media streaming, in particular.

BACKGROUND

Streaming media relates to constant delivery of media by a provider, to be received by and presented to an end-user.

Streaming may be used for any type of information such as data, audio or video, and content such as music, movies, games, closed captioning, stock ticker, real-time text, medical operations, or any other data to be streamed or broadcast. Common environments or applications of streaming media include but are not limited to interactive television information systems such as video on-demand (VoD) providing pre-ready contents or games, and internet television.

Streaming media has become more and more popular due to a number of reasons, including the increased network bandwidth, especially in the last mile, increased access to and commercialization of networks, especially the Internet, and the use of standard protocols and formats, such as TCP/IP, HTTP, and HTML.

A media stream can be streamed either live or on-demand. Live streams are generally provided by a means called "true streaming", which sends the information without saving the file to a hard disk. On-demand streaming may be provided by a means called progressive streaming or progressive download, which saves the file to a hard disk and then plays it from that location. On-demand streams may be saved to hard disks and servers for extended amounts of time, while the live streams are only generated and available at one time e.g., during an interactive game, a broadcast game or others.

An architecture for live or on-demand services in systems such as but not limited to cable television (CATV) systems may include a plurality of sources, such as files, game servers or others which retrieve or render a sequence of frames; optionally one or more encryption engines, for encrypting the streamed frames; and one or more edge devices, each of which packetizes sub-sets of input streams into a multi program/service transport stream (MPTS) format, modulates each MPTS through a quadrature amplitude modulation (QAM), and transmits the radio frequency (RF) modulated signal to the set top box at the client's premises.

In order to save transmission time, the data may be compressed prior to sending, and decompressed by the client device. The selected type of compression and streaming may be based on the types of the data, the clients and the communication channels.

For example, audio streams may be compressed using an audio codec such as MP3, Vorbis or AAC, while video streams may be compressed using a video codec such as H.264/MPEG-4 or VP8. The stream may be delivered from a streaming server to a streaming client using a transport protocol, such as MMS or RTP. The streaming client may interact with the streaming server using a control protocol, such as MMS or RTSP.

Traditionally, transmitting TV services over IP networks is considered less reliable then transmission over cable network. The reliability of the TV service may be measured by several factors, including but not limited to jitter, delay and packet losses, which may be measured by quantity and/or frequency.

It will be appreciated that the loss of even a single packet may have large impact on the video quality at the subscriber side, for example at the set top box (STB). For example, when H.264/MPEG-4 compression is used, a frame may be expressed relatively to a previous frame, e.g. indicating only the changes from the previous frame. Thus, if a frame is lost, subsequent frames may be useless as well.

Transmitting TV services over IP networks and overcoming lost packets may be done in a number of methods, for example:

Transmission Control Protocol (TCP) streaming is common for VoD services, and used for progressive download, meaning that the content is downloaded very fast to the STB, cached for a period such as a few seconds, after which the contents is played while the continuation content is received behind the scenes. Since the STB may have a large pre-multiplexing buffer, then in the case of lost packets, the TCP protocol will request the server side to re-transmit the lost packet. The server side may also maintain a large buffer of transmitted content, allowing it to resend lost IP packets even after some time has passed since the original transmission time. TCP streaming is generally not useful for Games on Demand (GoD) services since additional buffers may be required at the server side or at the STB, and the delay caused by the round trip can badly affect the user's gaming experience.

User Datagram Protocol (UDP) streaming is mostly common in broadcast services. UDP is generally an unreliable protocol and is vulnerable to lost IP packets. In order to recover lost packets, it is common to have a group of pictures (GOP) of a small size, typically 16-32 frames, which eliminates the lost packet artifacts within 0.5-1 second. Since an I frame (a frame for which no previous frame is required for decoding) requires higher bandwidth, then in order not to increase the delay, it is common to have very large or even unlimited GOP.

ProMpeg Forward Error Correction (FEC) over UDP streaming: Pro-mpeg FEC can be used to recover lost packets on the account of additional bandwidth, typically in the range of 40-60% overhead, by transmitting FEC packets generated by the server side to the STB side. Although the Pro-mpeg FEC method is useful for recovering lost packets, it has three main disadvantages that prohibit it for being used for GoD services. First, the method requires additional bandwidth (BW). If the maximal BW which is limited by the line rate is to be maintained, the additional required BW will be deducted from the transport BW, which mostly consists of video data, resulting in decreasing the video quality. Second, a large delay is added by streaming the FEC packets ahead of the TV content payload. Third, the number of packets that can be recovered is limited, and bursts of lost packets cannot be recovered.

BRIEF SUMMARY

One exemplary embodiment of the disclosed subject matter is a computer-implemented method performed by a computerized device, comprising: receiving by a computing device associated with a subscriber a frame constituting a part of video transmission, from an encoder; decoding the frame; determining that a packet within the frame is missing or corrupted; notifying an encoder about a missing packet; receiving from the encoder a first frame in which a first part is encoded independently of a preceding frame; decoding the first frame; receiving from the encoder a second frame in which a second part different from the first part is encoded independently of a preceding frame; and decoding the second frame. Within the method, the frame, the first frame or the second frame are optionally encoded in accordance with MPEG, ITU-T H264 recommendation, Joint Video Team of ISO/IEC MPEG, MPEG 2, H265, MP4, or ITU-T VCEG compression method. Within the method, the first part and the second part optionally constitute a full frame. Within the method, the first frame and the second frame are optionally transmitted within a predetermined time period. Within the method, each of the first part and the second part is optionally comprised of one or more macroblocks. Within the method, a part of the first frame other than the first part is optionally encoded based on a corresponding part in a preceding frame. Within the method, a part of the second frame other than the second part is optionally encoded based on a corresponding part in a preceding frame. The method may further comprise: notifying the encoder about a second missing packet after receiving the first frame; and receiving from the encoder a third frame in which the first part is encoded independently of a preceding frame, without receiving the second frame.

Another exemplary embodiment of the disclosed subject matter is a computer-implemented method performed by a computerized device, comprising: encoding a frame by an encoder; transmitting the frame to a computing device associated with a subscriber; receiving from the computing device a notification that a packet is missing from the frame; encoding a first frame in which a first part is encoded regardless of a preceding frame; transmitting the first frame to the computing device; encoding a second frame in which a second part is encoded regardless of a preceding frame, wherein the second part is different from the first part; and transmitting the second frame to the computing device. Within the method the frame, the first frame or the second frame are optionally encoded in accordance with MPEG, ITU-T H264 recommendation, Joint Video Team of ISO/ IEC MPEG, MPEG 2, H265, MP4, or ITU-T VCEG compression method. Within the method the first part and the second part may constitute a full frame. Within the method the first frame and the second frame are optionally transmitted within a predetermined time period. Within the method each of the first part and the second part optionally comprises one or more macroblock. Within the method a part of the first frame other than the first part is optionally encoded based on a corresponding part in a preceding frame. Within the method a part of the second frame other than the second part is optionally encoded based on a corresponding part in a preceding frame. The method may further comprise: receiving a notification about a second missing packet after transmitting the first frame; and transmitting a third frame in which the first part is encoded independently of a preceding frame, without transmitting a the second frame.

Yet another exemplary embodiment of the disclosed subject matter is a computer program product comprising: a non-transitory computer readable medium; a first program instruction for receiving by a computing device associated with a subscriber a frame constituting a part of video transmission, from an encoder; a second program instruction for decoding the frame; a third program instruction for determining that a packet within the frame is missing or corrupted; a fourth program instruction for notifying an encoder about a missing packet; a fifth program instruction for receiving from the encoder a first frame in which a first part is encoded independently of a preceding frame; a sixth program instruction for decoding the first frame; a seventh program instruction for receiving from the encoder a second frame in which a second part different from the first part is encoded independently of a preceding frame; and an eighth program instruction for decoding the second frame, wherein said first, second, third, fourth, fifth, sixth, seventh and eighth program instructions are stored on said non-transitory computer readable medium.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is the need to overcome lost IP packets or other sub-frame data in streaming on demand video and in particular in streaming games on demand.

When transmitting games, a significant delay is unacceptable, due to the required short response time. Thus, a GoD service cannot buffer too many packets in order not to cause delay, and cannot allow packet retransmitting in order to avoid network latency. When streaming games, it is common to use UDP which is less reliable, thus making the GoD service highly vulnerable to lost packets. When losing IP packets containing video information, the video corruption may be reflected in two aspects: (1) Artifacts in the current displayed frame: in mpeg2 and H264 encoding standards, each frame is divided into slices, wherein each slice has an independent header. Therefore, any loss of information within a slice may affect the entire slice, until the beginning of the next slice. The H264 protocol also supports single slice frames, in which a packet loss corrupts video artifacts from the lost point on, possibly in the entire frame; and (2) Artifacts in subsequent frames, until the end of the GOP: since each frame references previous frames, losing information in a frame affects also subsequent frames, until the encoder generates an intra macroblock, i.e., a macroblock that does not depend on previous ones, for any affected macroblock. Intra macroblock can be generated in a new GOP (an I frame), or when the scene changes or a significant motion is detected in a frame compared to a previous frame. In GoD service, since the GOP size is large or unlimited, the visual effect of lost data may be visible for very long time.

Thus, in order to recover lost packets, the following requirements have to be satisfied: (1) The available bandwidth should not be reduced since this will decrease the overall video quality; (2) Buffer sizes should not be increased so as not cause delays; and (3) The player should be able to continue playing without long interferences and video freezes.

In addition, it is required that unlike methods which invalidate frames, the encoder should not invalidate the faulty frames for which it has to maintain previous raw frames up to a certain size, for example a 100-200 ms interval, which requires large memory. If the encoder is not to use such information, then the STB should not figure out which frame is faulty and should not send this information to the encoder.

One technical solution comprises detecting the loss of IP packets by the STB. When it is detected that an IP packet was lost, the STB may send a message to the video encoder residing on the server, notifying it that a packet loss was detected. Upon receiving the lost packet message, the encoder may start refreshing all macroblocks in subsequent frames within the next predetermined period, such as one second. It will be appreciated that each macroblock is refreshed at least once, but preferably zero or very few macroblocks are refreshed more than once. The number of refreshed macroblocks in each frame may be determined by the frame rate and the predetermined time in which the whole frame is to be refreshed, such as the one second. In each frame a small number of macroblocks may be refreshed, such that the video frame rate does not decrease, and the video quality does not degrade. The overall amount of data added required for each per frame is small enough to be compensated by the macroblocks that are not refreshed within that frame.

In some embodiments, during the predetermined time, such as the one second, additional packet loss notifications may be ignored until the current refresh sequence is completed. Since the STB operates in the level of IP packets and the IP frame receiving module of the STB has no knowledge of video frames, then even if the lost packets are spread over a few frames, still within the predetermined time, the video artifacts will be eliminated.

However, in some embodiments if newly missing packets are detected during the recovery period in which frames are sent with independent macroblocks, the recovery may be stopped and restarted with new frames, since the new missing packet may corrupt whole frames, such that further frames sent as part of the previous recovery are useless. In other embodiments, other approaches may be taken, for example determining whether the new missing packet is included in a macroblock that has or has not been recovered yet, and deciding accordingly whether to continue the recovery, or to stop and restart it.

One technical effect of the disclosure is the provisioning of a method and apparatus for overcoming sporadic losses of IP packets in IP television (IPTV) or Over the Top (OTT) networks. The method and apparatus provide for recovering from lost packets in video transmission, even when the packets affect subsequent frames beyond the one being transmitted. The method and apparatus enable fast recovery from missed frames, and resuming of the regular service.

The method and apparatus are easy to implement due to the bidirectional communication between the STB and the encoder, and thus do not add significant burden to the STB side.

The STB side does not have to implement the video and encryption standards, and the change may be limited to the UDP receiving module. In real time protocol (RTP) the IP packets contain an identifier used for synchronizing the audio and the video. The STB may read this identifier, check the identifier sequence and determine if a packet is missing.

The disclosed method and apparatus are particularly useful for systems that require low delay such as GoD systems.

Figure 1A:
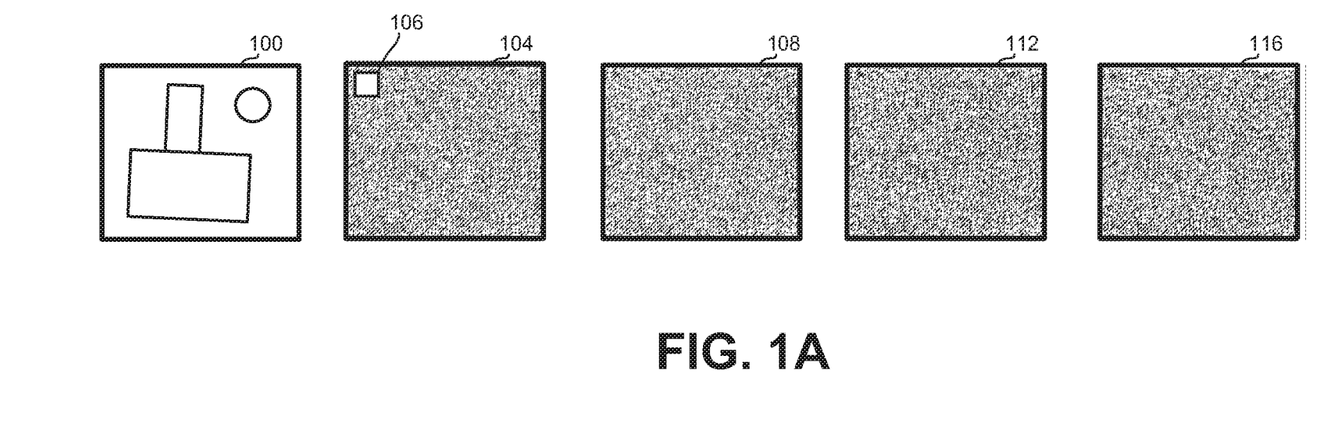
FIG. 1A shows an illustrative example of the problem caused by a lost sub-frame data.
Figure 1B:
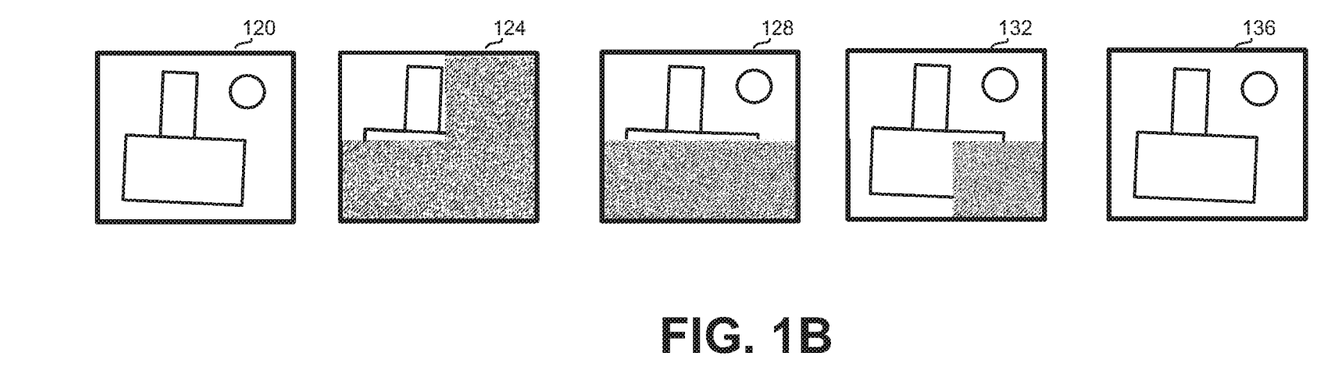
FIG. 1B shows an illustrative example of recovering from a lost sub-frame data, in accordance with some exemplary embodiments of the disclosed subject matter.

Referring now to FIGS. 1A and 1B. FIG. 1A shows an illustrative example of the problem caused by a lost packet, wherein a sequence of frames 100, 104, 108, 112, and 116 are received by a set top box (STB). The system may operate in a compression method in which macroblocks are encoded based on the macroblocks at the same location within the frame in a previous frame, e.g., only the changes from the previous frame are indicated rather than the macroblock content. For example the frames may be encoded and decoded in accordance with the H.264, MPEG, MPEG-2, MPEG-4, H265, MP4, or ITU-T VCEG or any other encoding method.

Frame 100 is received at the STB and encoded without special problems. When frame 104 is received, packet 106 is determined to be lost, which causes whole frame 104 to be corrupted. Consequent frames, such as frames 108, 112 and 116 wherein the macroblocks depend on the macroblocks of the preceding frame, e.g., no new scene or big gesture is started, are therefore corrupted as well.

It will be appreciated that depending on the location of the missing packet within the frame, one or more parts of frames 104, 108, 112 and 116 are received and decoded fine, but other parts may be corrupted and cannot be decoded in further frames.

FIG. 1B shows an illustrative example of recovering from a lost frame. In the exemplary scenario of FIG. 1B, frame 104 is the same as frame 100 and is received by the STB without problems. Once the STB determined that a packet is missing and the following frame is corrupted, it may have notified the encoder, and the encoder may start sending frames which are different from frames 104, 108, 112 and 116. Thus, after having received the notification, the encoder sends consequent frames, such that in each frame, the contents of one or more macroblocks are encoded independently of preceding frames. Thus, in the example of FIG. 1B, frame 124 has its top left macroblock provided in an independent manner. In frame 128, the top right macroblock is provided in an independent manner, while the top left macroblock may be encoded based on the corresponding macroblock in frame 124 which is known to be proper.

Similarly, frames 132 and 136 provide the bottom left and bottom right macroblocks, respectively, in an independent manner, such that frame 136 and on arc proper and the stream recovers from the lost packet.

It will be appreciated that the illustrations of FIG. 1A and FIG. 1B are exemplary only, and that a typical frame comprises significantly more than four macroblocks. For example, a frame may comprise blocks 16×16 pixels, such that for a 720p resolution the required number of macroblocks is 1280×720/(16×16)=3600 per frame.

Figure 2:
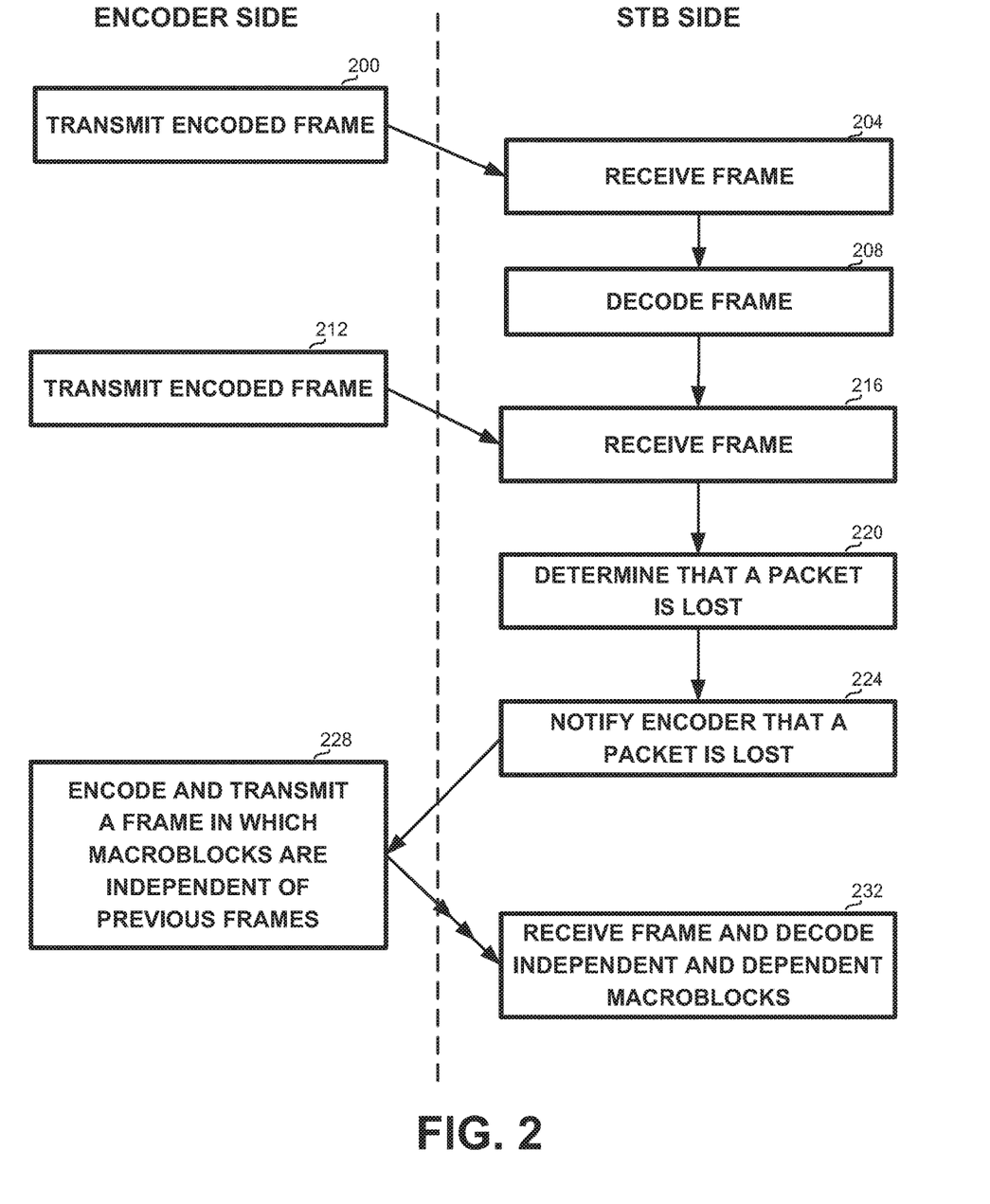
FIG. 2 shows a flowchart diagram of steps in a method for recovering from a lost sub-frame data, in accordance with some exemplary embodiments of the disclosed subject matter.

Referring now to FIG. 2, showing a flowchart diagram of steps in a method for recovering from lost IP packets in video transmission.

On step 200 the encoder transmits one or more frames to the STB side, using a protocol such as TCP, UDP or others.

On step 204, the STB receives each such frame and on step 208 the STB decodes the frame so it can be rendered. The frame may be received from the encoder directly or indirectly.

Steps 200 204 and 208 may repeat for a multiplicity of frames, as long as no frame is corrupted.

On step 212 the encoder transmits yet another frame. On step 216 the STB receives the frame, but on step 220 the STB determines that one or more IP packets are missing from the frame. Determining a missing frame can be done, for example by keeping track of the identifiers associated with the packets, and realizing that a newly received packet does not immediately follow a previously received packet. A missing packet may corrupt not only the current frame but also subsequent frames which are encoded based on the differences relatively to the current frame or to consequent frames.

On step 224 the STB may notify the encoder that a packet is missing.

On step 228, upon receiving the notification, the encoder may transmit the subsequent frame with some of its macroblocks encoded independently, and not as one or more changes from the same macroblock in a previous frame.

On step 232 the STB may receive and decode each received frame. The frame may be decoded as follows:

Macroblocks that have already been decoded independently since the last notification may be decoded normally, for example based on changes from corresponding macroblock in a preceding frame.

Macroblocks that are being encoded independently in the current frame are decoded as such, without relying on corresponding macroblock in a preceding frame.

The rest of the macroblocks, which have not been sent independently yet since the notification, may be left as in the previous frames, or handled otherwise.

Steps 228 and 232 may be repeated for further frames, until all macroblocks have been encoded in independent manner and transmitted as part of a frame. Upon receiving each such frame by the STB, the new independent macroblocks are decoded as such, while macroblocks which have already been transmitted in independent manner since the last notification, may be decoded based on their content in a preceding frame.

Preferably, steps 228 and 232 are performed at least twice wherein each of the at least two frames has different macroblocks encoded independently, such that the frame sequence is fully recovered after the at least two frames, and within a predetermined timeframe.

Thus, within a limited number of frames, the whole frame is transmitted and can be decoded correctly, such that the streaming recovers from the lost packet in a short time duration, such as between 0.2 second and 2 seconds, for example one second. The process may add insignificant volume to each frame, such that the frame rate may be maintained without violating the maximal bitrate.

It will be appreciated that the disclosed method may also be used for recovering from other transmission problems, such as otherwise corrupted or missing frames.

Once all macroblocks have been encoded and transmitted in independent manner, the encoder may continue encoding and transmitting frames, and the STB may continue receiving and decoding the frames as described in association with steps 200, 204 and 208 above.

If newly missing packets are detected during the recovery period in which frames are sent with independent macroblocks, the STB may send another notification to the encoder. The encoder may then stop sending the recovery frames, since they may be undecodable due to the missing packet, and may restart the recovery by sending again frames which comprise all the macroblocks as independent. In other embodiments, it may be determined whether the new missing packet is included in a macroblock that has or has not been recovered yet, and deciding accordingly whether to continue recovery, or to stop and start over.

Figure 3:
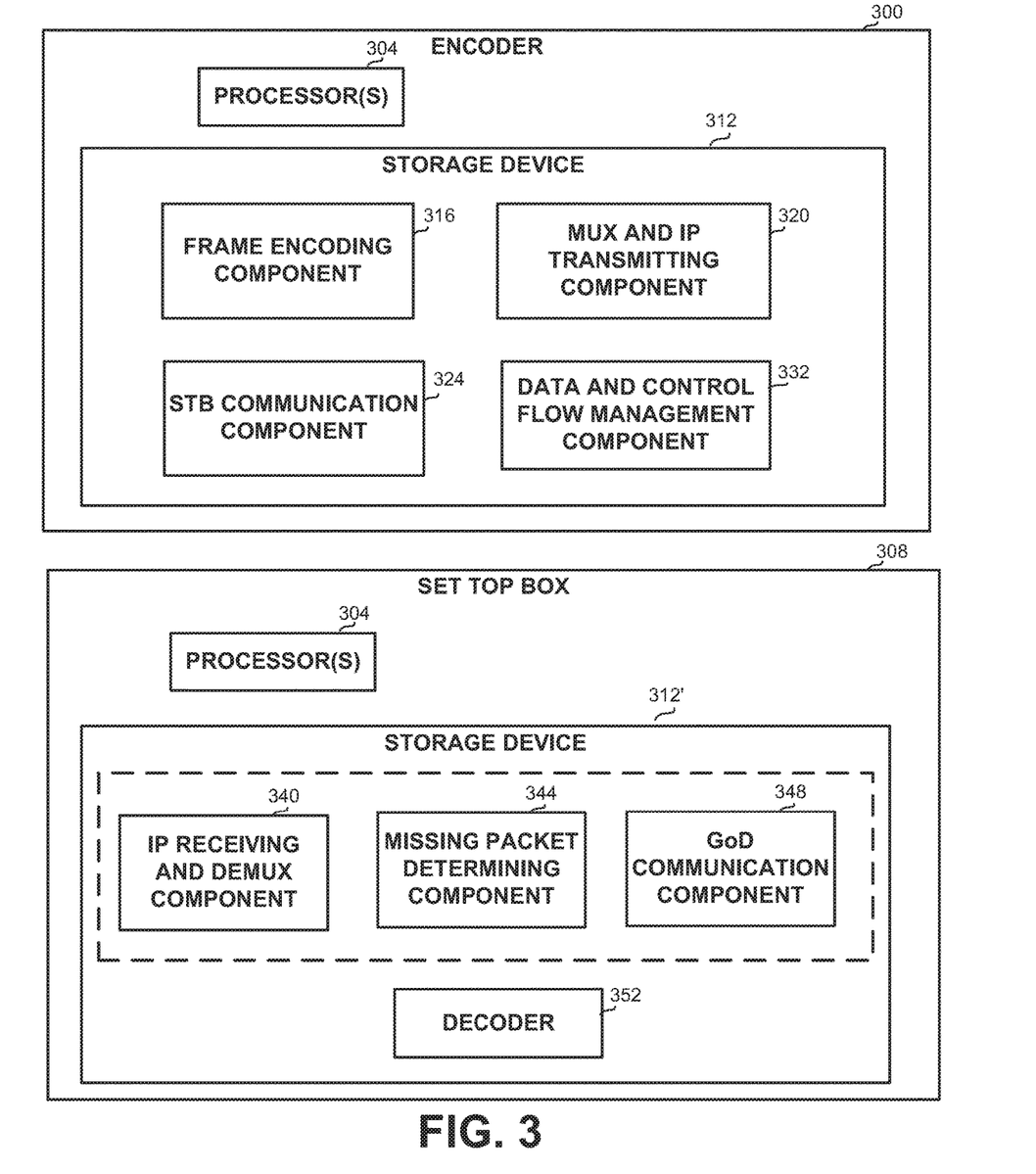
FIG. 3 shows a block diagram of an apparatus for covering from a lost sub-frame data, in accordance with some exemplary embodiments of the disclosed subject matter.

Referring now to FIG. 3, showing a block diagram of an apparatus for recovering from lost packets in media streaming.

The apparatus comprises one or more encoders 300 and one or more STBs 308, wherein the encoders may be located at a transmission station, and each STB may be located at a subscriber's location such as a home, a business, or the like. In some embodiments, each encoder may provide services to a multiplicity of STBs. In some embodiments, an STB may receive services from one or more encoders.

Each encoder 300 and STB 308 may be implemented as a computing device, which may comprise one or more processors 304, or loaded to and executed by such computing device. Any of processors 304 may be a Central Processing Unit (CPU), a microprocessor, an electronic circuit, an Integrated Circuit (IC) or the like. Alternatively, any encoder 300 or STB 308 can be implemented as firmware written for or ported to a specific processor such as digital signal processor (DSP) or microcontrollers, or can be implemented as hardware or configurable hardware such as field programmable gate array (FPGA) or application specific integrated circuit (ASIC). Processors 304 may be utilized to perform computations required by encoder 300 or STB 308 or any of their subcomponents.

In some embodiments, encoder 300 or STB 308 may comprise one or more storage devices 312 or 312' for storing executable components, and which may also contain data during execution of one or more components. Each storage device 312 or 312' may be persistent or volatile. For example, storage device 312 or 312' can be a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like. In some exemplary embodiments, any storage device 312 or 312' may retain program code operative to cause any of processors 304 to perform acts associated with any of the steps shown in FIG. 2 above, for example encoding, decoding, or the like.

The components detailed below may be implemented as one or more sets of interrelated computer instructions, executed for example by any of processors 304 or by another processor. The components may be arranged as one or more executable files, dynamic libraries, static libraries, methods, functions, services, or the like, programmed in any programming language and under any computing environment.

Storage device 312 of encoder 300 may comprise frame encoding component 316 for encoding frames in accordance with the used transmission protocol and encoding method. For example, when encoding with H.264 protocol, each frame may comprise a multiplicity of macroblocks, wherein each macroblock may be encoded based on changes relatively to the corresponding macroblock in a preceding frame. However, some frames which are significantly different from previous frames, for example in scene changes, may be encoded independently without being based on contents of previous frames. Frame encoding component 316 may encode frames in accordance with the current needs, e.g., if a packet has been lost then the next frames may be encoded with independent macroblocks which are independent on corresponding macroblocks in preceding frames, while in normal situations the frames may be encoded with the normal encoding method.

Storage device 312 of encoder 300 may further comprise multiplexer and IP transmitting component 320 for multiplexing and transmitting the encoded frames in accordance with the used transmission protocol. In some embodiments, both the audio and the video components of the frames are multiplexed.

Storage device 312 of encoder 300 may further comprise STB communication component 324 for receiving information or transmitting information to one or more STBs, for example receiving from a particular STB a notification about a missing packet or a corrupted frame. STB communication component 324 may provide for bidirectional communication between the encoder and the GoD client such as the STB, which enables recovery from lost packets.

Storage device 312 may also comprise data and control flow management component 332, for managing the information and control flow among the detailed components, for example, determining the switch between encoding methods, determining which macroblocks are to be refreshed in each frame and which are not, keeping track of the macroblocks refresh, or the like.

Storage device 312' of set top box 308 may comprise IP receiving and demultiplexing component 340 for receiving encoded frames from an encoder and demultiplexing the audio and the video components of the frames.

Storage device 312' may also comprise missing packet determining component 344 for determining that one or more packets from the received IPs are missing thus corrupting one or more frames, or that one or more frames are otherwise corrupted.

Yet another component of storage device 312' may be GoD communication component 348 for communicating with STB communication component 324 of encoder 300, for example sending a notification to be received by STB communication component 324 that a packet has been lost. It will be appreciated that GoD communication component 348 may exist in current STBs for various purposes, and that the communication protocol between STB communication component 324 and GoD communication component 348 may be extended to support missing packets notifications.

It will be appreciated that IP receiving and demultiplexing component 340, missing packet determining component 344 and GoD communication component 348 may be implemented as one or more component or a set of inter-related components.

storage device 312' may comprise frame decoding component 352 for decoding the received IP in accordance with the used protocol, including audio and video decoding. Thus, frames received during normal transmission when no packets have been notified as missing are decoded, as well as frames received after a notification has been sent and before the transmission of normal frames has been restored. In such frames some macroblocks may be decoded independently without referring to previous frames, while other macroblocks, for example macroblocks that have previously been transmitted independently are decoded based on previous ones. Yet other macroblocks, for example macroblocks for which no independent macroblocks have been transmitted since the last notification, may not be decoded at all and may be kept the same as in a previous frame.

It will be appreciated that each of the described encoder and STB may comprise multiplicity of additional components responsible for additional functionalities as known or as will become known in the art.

It will be appreciated that the disclosed method and apparatus are not limited to frames comprising images, but can be applied also for transmitting or otherwise utilizing a stream of any type of data which may consist of frames comprised of macroblocks.

The disclosed methods and apparatus are not limited to a particular field and may be used in any application in which it is required to maintain lost packet recovery and low delay, wherein the information may be real-time information which may be generated prior to transmission.

The disclosed method and apparatus may operate with any encoding method that is currently known or that will become known in the future, such as but not limited to MPEG, ITU-T H264 recommendation, Joint Video Team of ISO/IEC MPEG, MPEG 2, H265, MP4 ITU-T VCEG, or any other currently known encoding method that may be effected by lost packets, or nay such method that will become known in the future.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method performed by a computerized device, comprising:

receiving by a computing device associated with a subscriber an initial frame constituting a part of video transmission, from an encoder;

decoding the initial frame;

determining that a first packet within the initial frame is missing or corrupted, the missing first packet corrupting the initial frame and subsequent frames which are encoded based on differences relative to the initial frame or to consequent frames sent by the encoder;

notifying an encoder about the missing first packet;

receiving, during a recovery period, from the encoder at least one first frame in which at least one first part is encoded independently of a preceding frame;

decoding the at least one first frame;

sending to the encoder additional information indicating that a second packet is missing in the first frame;

receiving from the encoder at least one second frame in which at least one second part different from the at least one first part is encoded independently of a preceding frame; and decoding the at least one second frame, wherein the at least one first part and the at least one second part are determined independently of which packet within the initial frame is missing or corrupted, and sized to be small enough such that the video frame rate does not decrease and the maximal bitrate is not violated, and wherein if newly missing packets are detected during the recovery period, the computing device stops receiving frames and the recovery period is restarted.

2. The computer-implemented method of claim 1 wherein the initial frame, the at least one first frame or the at least one second frame are encoded in accordance with MPEG, ITU-T H264 recommendation, Joint Video Team of ISO/IEC MPEG, MPEG 2, H265, MP4, or ITU-T VCEG compression method.

3. The computer-implemented method of claim 1 further comprising receiving at least one additional frame wherein in each respective additional frame at least one additional part is different from the at least one first part, the at least one second part and previous additional parts is encoded independently of a preceding frame, wherein the at least one first frame, the at least one second frame, and the at least one additional frame together refresh a full frame and are received within a predetermined time period.

4. The computer-implemented method of claim 1 wherein each of the at least one first part and the at least one second part is at least one macroblock.

5. The computer implemented method of claim 3 wherein receiving the at least one additional frame is performed without receiving a frame in which all parts are encoded independently of another frame.

6. A computer-implemented method performed by a computerized device, comprising:
encoding an initial frame constituting a part of video transmission by an encoder;
transmitting the initial frame to a computing device;
receiving from the computing device information indicating that a first packet is missing from the initial frame, the missing first packet corrupting the initial frame and subsequent frames which are encoded based on differences relative to the initial frame or to consequent frames sent by the encoder;
encoding at least one first frame independently of a preceding frame;
transmitting, during a recover period, the at least one first frame to the computing device;
receiving from the computing device additional information indicating that a second packet is missing in the first frame;
encoding at least one second frame in which at least one second part different from the at least one first part is encoded independently of a preceding frame; and
transmitting the at least one second frame to the computing device,
wherein the at least one first part and the at least one second part are determined independently of which packet within the initial frame is missing or corrupted, and sized to be small enough such that the video frame rate does not decrease and the maximal bitrate is not violated, and
wherein if newly missing packets are detected during the recovery period, the encoder stops transmitting frames and the recovery period is restarted.

7. The computer-implemented method of claim 6 wherein the initial frame, the at least one first frame, or the at least one second frame are encoded in accordance with MPEG, ITU-T H264 recommendation, Joint Video Team of ISO/IEC MPEG, MPEG 2, H265, MP4, or ITU-T VCEG compression method.

8. The computer-implemented method of claim 6 further comprising transmitting at least one additional frame wherein in each additional frame at least one additional part is different from the at least one first part, the at least one second part and previous additional parts is encoded independently of a preceding frame, wherein the at least one first frame, the at least one second frame and the at least one additional frame are transmitted within a predetermined time period.

9. The computer-implemented method of claim 6 wherein each of the at least one first part and the at least one second part is at least one macroblock.

10. The computer-implemented method of claim 8 wherein transmitting the at least one additional frame is performed without transmitting a frame in which all parts are encoded independently of another frame.

11. A computer program product comprising:
a non-transitory computer readable medium storing instructions for:
receiving by a computing device an initial frame constituting a part of video transmission, from an encoder;
decoding the initial frame;
determining that a first packet within the initial frame is missing or corrupted, the missing first packet corrupting the initial frame and subsequent frames which are encoded based on differences relative to the initial frame or to consequent frames sent by the encoder;
sending to an encoder information indicating that the first packet is missing;
receiving, during a recovery period, from the encoder at least one first frame in which at least one first part is encoded independently of a preceding frame;
decoding the at least one first frame;
sending to the encoder additional information indicating that a second packet is missing in the first frame;
receiving from the encoder the at least one second frame in which at least one second part different from the at least one first part is encoded independently of a preceding frame; and
decoding the at least one second frame,
wherein the at least one first part and the at least one second part are determined independently of which packet within the initial frame is missing or corrupted, and sized to be small enough such that the video frame rate does not decrease and the maximal bitrate is not violated, and
wherein if newly missing packets are detected during the recovery period, the computing device stops receiving frames and the recovery period is restarted.

12. The computer program product of claim 11 further comprising receiving at least one additional frame wherein in each additional frame at least one additional part different from the at least one first part, the at least one second part and previous additional parts is encoded independently of a preceding frame, wherein the at least one first frame, the at least one second frame, and the at least one additional frame together refresh a full frame and are received within a predetermined time period.

13. The computer program product of claim 11 wherein each of the at least one first part and the at least one second part is at least one macroblock.

14. The computer program product of claim 12 wherein receiving the at least one additional frame is performed without receiving a frame in which all parts are encoded independently of another frame.

* * * * *